US012810810B2

(12) United States Patent
Lim et al.

(10) Patent No.: US 12,810,810 B2
(45) Date of Patent: Nov. 24, 2026

(54) DRIVING CIRCUIT AND ELECTRONIC DEVICE

(71) Applicant: Samsung Display Co., Ltd., Yongin-si (KR)

(72) Inventors: Jaekeun Lim, Yongin-si (KR); Bonseog Gu, Yongin-si (KR); Jinyoung Roh, Yongin-si (KR); Haekwan Seo, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 19/220,782

(22) Filed: May 28, 2025

(65) Prior Publication Data

US 2025/0372046 A1 Dec. 4, 2025

(30) Foreign Application Priority Data

May 31, 2024 (KR) ........................ 10-2024-0071810

(51) Int. Cl.
*G09G 3/3266* (2016.01)

(52) U.S. Cl.
CPC ... *G09G 3/3266* (2013.01); *G09G 2310/0286* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 10,127,862 | B2 | 11/2018 | Ma | |
| 2021/0158760 | A1 | 5/2021 | Jang | |
| 2022/0309998 | A1 | 9/2022 | Lim et al. | |
| 2023/0040896 | A1 | 2/2023 | Cho et al. | |
| 2025/0322781 | A1* | 10/2025 | Lim | G09G 3/32 |

FOREIGN PATENT DOCUMENTS

| | | | |
|---|---|---|---|
| CN | 115223489 | A | 10/2022 |
| KR | 1020210062773 | A | 6/2021 |
| KR | 1020220008951 | A | 1/2022 |

* cited by examiner

*Primary Examiner* — Christopher J Kohlman
(74) *Attorney, Agent, or Firm* — CANTOR COLBURN LLP

(57) ABSTRACT

Each of a plurality of stages of a driving circuit includes a first transistor connected to an input terminal, to which a start signal is input, and a first node and including a gate connected to a first clock terminal, to which a first clock signal is input, and a second transistor connected to a first output terminal and a second clock terminal, to which a second clock signal is input, and including a gate connected to the first node. The second clock signal swings between a first voltage and a second voltage lower than the first voltage, and the first clock signal swings between the first voltage and a third voltage lower than the second voltage.

20 Claims, 13 Drawing Sheets

DRIVING CIRCUIT AND ELECTRONIC DEVICE

This application claims priority to Korean Patent Application No. 10-2024-0071810, filed on May 31, 2024, and all the benefits accruing therefrom under 35 U.S.C. § 119, the content of which in its entirety is herein incorporated by reference.

BACKGROUND

1. Field

One or more embodiments relate to a driving circuit, and more particularly, to a driving circuit from which gate signals are output and a display device and electronic device including the driving circuit.

2. Description of the Related Art

In general, a display device includes a pixel area including a plurality of pixels, a gate driving circuit, a data driving circuit, and a controller. The gate driving circuit includes stages connected to gate lines, and the stages supply gate signals to the gate lines connected thereto, in response to signals from the controller.

SUMMARY

One or more embodiments include a driving circuit from which gate signals may be stably output at low power, and a display device and electronic device including the driving circuit. The technical problems to be achieved by one or more embodiments are not limited to the technical problems described above, and other technical problems not described herein will be clearly understood from the present description by those of ordinary skill in the art.

According to one or more embodiments, a driving circuit includes a plurality of stages, wherein each of the plurality of stages includes a first transistor connected to an input terminal, to which a start signal is input and a first node, and including a gate connected to a first clock terminal, to which a first clock signal is input, and a second transistor connected to a first output terminal and a second clock terminal, to which a second clock signal is input, and including a gate connected to the first node. In such embodiments, the second clock signal swings between a first voltage and a second voltage lower than the first voltage, and the first clock signal swings between the first voltage and a third voltage lower than the second voltage.

In an embodiment, a duration during which the first clock signal is in a level of the third voltage may not overlap a duration during which the second clock signal is in a level of the second voltage, and the duration during which the first clock signal is in the level of the third voltage may be longer than the duration during which the second clock signal is in the level of the second voltage.

In an embodiment, each of the plurality of stages may further include a third transistor connected to a first terminal, to which the first voltage is input, and the first output terminal, and including a gate connected to a second node.

In an embodiment, each of the plurality of stages may further include a fourth transistor connected to the first terminal and a second output terminal, and including a gate connected to the second node, a fifth transistor connected to the second output terminal and a third clock terminal, to which a third clock signal is input, and including a gate connected to the first node, and a first capacitor connected to the second output terminal and the first node, where the third clock signal may swing between the first voltage and the third voltage and may be input phase-shifted from the first clock signal by a ½ period.

In an embodiment, each of the plurality of stages may further include a sixth transistor connected between the first terminal and the first node, and including a gate connected to the second node, a seventh transistor connected between the sixth transistor and the first node, and including a gate connected to the second clock terminal, an eighth transistor connected to the second node and a fourth clock terminal, to which a fourth clock signal is input, and including a gate connected to the first node, and a ninth transistor connected to the second node and a second terminal, to which the second voltage is input, and including a gate connected to the first clock terminal, where the fourth clock signal may swing between the first voltage and the second voltage and may be input phase-shifted from the second clock signal by a ½ period.

In an embodiment, each of the plurality of stages may further include a second capacitor connected to the first terminal and the second node.

In an embodiment, each of the plurality of stages may further include a tenth transistor connected to the first transistor and the first node, and including a gate connected to a third terminal, to which the third voltage is input.

In an embodiment, each of the plurality of stages may further include a sixth transistor connected between the first terminal and the first node, and including a gate connected to the second node, a seventh transistor connected between the sixth transistor and the first node, and including a gate connected to the second clock terminal, an eighth transistor connected to the second node and a fourth clock terminal, to which a fourth clock signal is input, and including a gate connected to the first node, and a ninth transistor connected to the second node and a second terminal, to which the third voltage is input, and including a gate connected to the first clock terminal, where the fourth clock signal may swing between the first voltage and the second voltage and may be input phase-shifted from the second clock signal by a ½ period.

In an embodiment, each of the plurality of stages may further include a second capacitor connected to the first terminal and the second node.

In an embodiment, each of the plurality of stages may further include a tenth transistor connected to the first transistor and the first node, and including a gate connected to the second terminal.

In an embodiment, the start signal may be an external signal or a carry signal output from a previous stage.

According to one or more embodiments, a driving circuit includes a plurality of stages, where each of the plurality of stages includes a control circuit which controls voltages of a first node and a second node based on a start signal input to an input terminal, a first output circuit which outputs an output signal to a pixel of a display area based on the voltages of the first node and the second node, and a second output circuit which outputs a carry signal to a next stage based on the voltages of the first node and the second node. In such embodiments, the control circuit includes a first transistor connected to the input terminal and the first node, and including a gate connected to a first clock terminal, to which a first clock signal is input. In such embodiment, the first output circuit includes a second transistor connected to a first output terminal, which outputs the output signal, and a second clock terminal, to which a second clock signal is input, and including a gate connected to the first node. In such embodiment, the second output circuit includes a third transistor connected to a second output terminal, which outputs the carry signal, and a third clock terminal, to which a third clock signal is input, and including a gate connected to the first node. In such embodiment, the second clock signal swings between a first voltage and a second voltage lower than the first voltage, and the first clock signal and the third clock signal swing between the first voltage and a third voltage lower than the second voltage, where the third clock signal is input phase-shifted from the first clock signal by a ½ period.

In an embodiment, a duration during which the first clock signal is in a level of the third voltage may not overlap a duration during which the second clock signal is in a level of the second voltage, and the duration during which the first clock signal is in the level of the third voltage may be longer than the duration during which the second clock signal is in the level of the second voltage.

In an embodiment, the first output circuit may further include a fourth transistor connected to a first terminal, to which the first voltage is input, and the first output terminal, and including a gate connected to the second node, and the second output circuit may further include a fifth transistor connected to the first terminal and the second output terminal, and including a gate connected to the second node, and a first capacitor connected to the second output terminal and the first node.

In an embodiment, the control circuit may further include a sixth transistor connected between the first terminal and the first node, and including a gate connected to the second node, a seventh transistor connected between the sixth transistor and the first node, and including a gate connected to the second clock terminal, an eighth transistor connected to the second node and a fourth clock terminal, to which a fourth clock signal is input, and including a gate connected to the first node, a ninth transistor connected to the second node and a second terminal, to which the second voltage is input, and including a gate connected to the first clock terminal, a tenth transistor connected to the first transistor and the first node and including a gate connected to a third terminal, to which the third voltage is input, and a second capacitor connected to the first terminal and the second node, where the fourth clock signal may swing between the first voltage and the second voltage and may be input phase-shifted from the second clock signal by a ½ period.

In an embodiment, the control circuit may further include a sixth transistor connected between the first terminal and the first node, and including a gate connected to the second node, a seventh transistor connected between the sixth transistor and the first node, and including a gate connected to the second clock terminal, an eighth transistor connected to the second node and a fourth clock terminal, to which a fourth clock signal is input, and including a gate connected to the first node, a ninth transistor connected to the second node and a second terminal, to which the third voltage is input, and including a gate connected to the first clock terminal, a tenth transistor connected to the first transistor and the first node, and including a gate connected to the second terminal, and a second capacitor connected to the first terminal and the second node, where the fourth clock signal may swing between the first voltage and the second voltage and may be input phase-shifted from the second clock signal by a ½ period.

According to one or more embodiments, an electronic device includes a controller which output a plurality of clock signals, a power supply circuit which output a reference voltage, and a driving circuit which output a gate signal based on the plurality of clock signals and the reference voltage. In such embodiment, the driving circuit includes a plurality of stages, where each of the plurality of stages includes a first transistor connected to an input terminal, to which a start signal is input and a first node, and including a gate connected to a first clock terminal to which a first clock signal is input, and a second transistor connected to a first output terminal and a second clock terminal, to which a second clock signal is input, and including a gate connected to the first node. In such embodiment, the second clock signal swings between a first voltage and a second voltage lower than the first voltage, and the first clock signal swings between the first voltage and a third voltage lower than the second voltage.

In an embodiment, each of the plurality of stages may further include a third transistor connected to a first terminal, to which the first voltage is input, and the first output terminal, and including a gate connected to a second node, a fourth transistor connected to the first terminal and a second output terminal, and including a gate connected to the second node, a fifth transistor connected to the second output terminal and a third clock terminal, to which a third clock signal is input, and including a gate connected to the first node, and a first capacitor connected to the second output terminal and the first node, where the third clock signal may swing between the first voltage and the third voltage and may be input phase-shifted from the first clock signal by a ½ period.

In an embodiment, each of the plurality of stages may further include a sixth transistor connected between the first terminal and the first node, and including a gate connected to the second node, a seventh transistor connected between the sixth transistor and the first node, and including a gate connected to the second clock terminal, an eighth transistor connected to the second node and a fourth clock terminal, to which a fourth clock signal is input, and including a gate connected to the first node, and a ninth transistor connected to the second node and a second terminal, to which the second voltage is input, and including a gate connected to the first clock terminal, where the fourth clock signal may swing between the first voltage and the second voltage and may be input phase-shifted from the second clock signal by a ½ period.

In an embodiment, each of the plurality of stages may further include a tenth transistor connected to the first transistor and the first node, and including a gate connected to a third terminal, to which the third voltage is input.

In an embodiment, each of the plurality of stages may further include a sixth transistor connected between the first terminal and the first node and including a gate connected to the second node, a seventh transistor connected between the sixth transistor and the first node, and including a gate connected to the second clock terminal, an eighth transistor connected to the second node and a fourth clock terminal, to which a fourth clock signal is input, and including a gate connected to the first node, a ninth transistor connected to the second node and a second terminal, to which the third voltage is input, and including a gate connected to the first clock terminal, and a tenth transistor connected to the first transistor and the first node, and including a gate connected to the second terminal, where the fourth clock signal may swing between the first voltage and the second voltage and may be input phase-shifted from the second clock signal by a ½ period.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
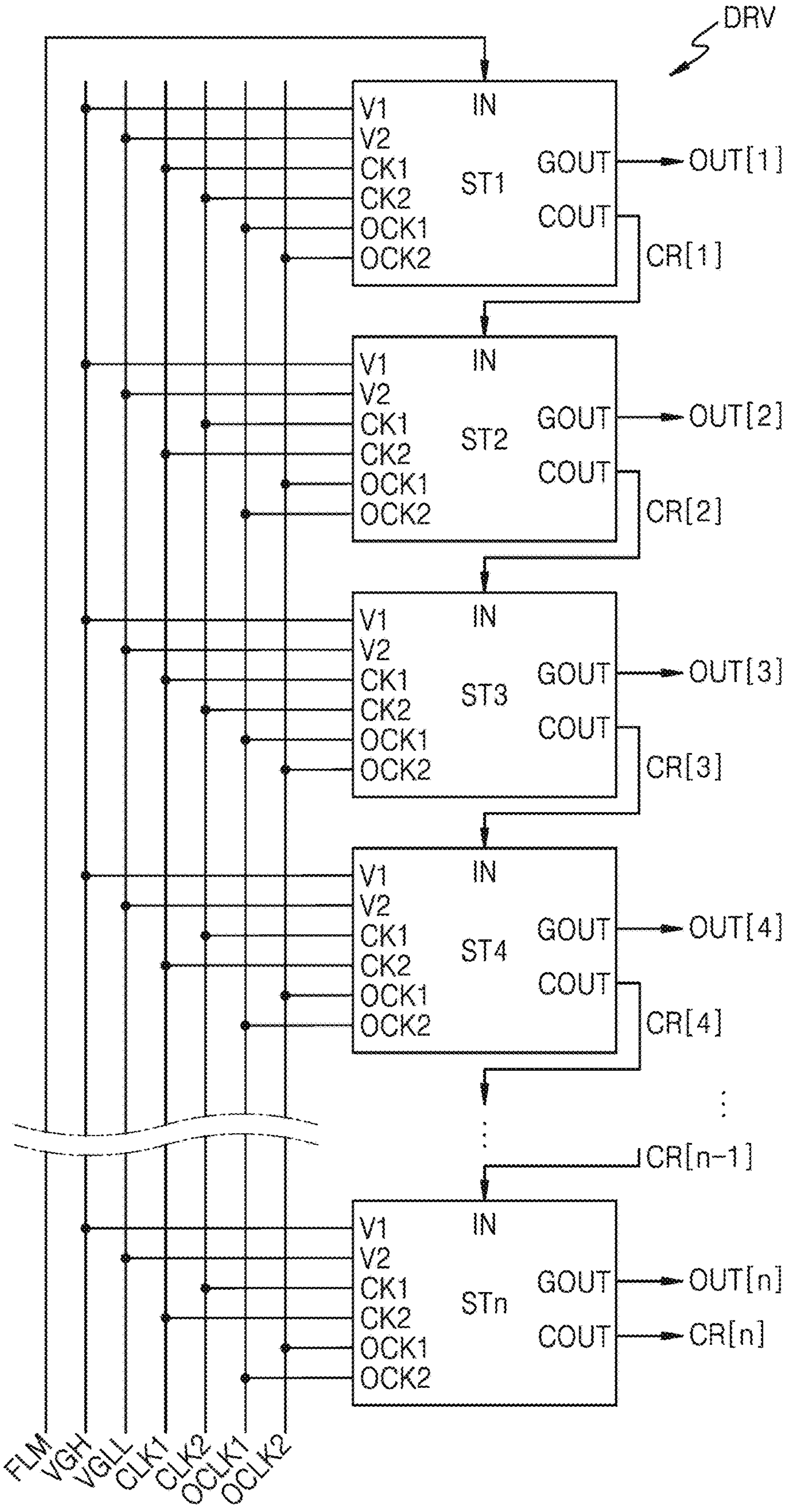
FIG. 1 is a schematic diagram of a driving circuit according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

As the present description allows for various changes and numerous embodiments, certain embodiments will be illustrated in the drawings and described in the written description. Effects and features of one or more embodiments and methods of accomplishing the same will become apparent from the following detailed description of the one or more embodiments, taken in conjunction with the accompanying drawings. However, the embodiments disclosed herein may have different forms and should not be construed as being limited to the descriptions set forth herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b or c" or "at least one selected from a, b and c" indicates only a, only b, only c, both a and b, both a and c, both b and c, all of a, b, and c, or variations thereof. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Sizes of elements in the drawings may be exaggerated or reduced for convenience of explanation. For example, since sizes and thicknesses of elements in the drawings are arbitrarily illustrated for convenience of explanation, the following embodiments are not limited thereto.

When it is referred that X and Y are connected, it may include the case where X and Y are physically connected directly or indirectly, the case where X and Y are functionally connected, and the case where X and Y are electrically connected. The case where X and Y are indirectly connected may include the case where X and Y are indirectly connected with another element disposed therebetween. In this regard, X and Y may include elements (e.g., apparatuses, devices, circuits, wirings, electrodes, terminals, films, layers, regions, etc.). Therefore, connection is not limited to a preset connection relationship, for example, not limited to a connection relationship illustrated in the drawings or detailed descriptions, and may include other connection relationships not illustrated in the drawings or detailed descriptions.

As used herein, when it is referred that X and Y are connected, it may mean the case where X and Y are electrically connected. The case where X and Y are electrically connected may include the case where X and Y are directly connected and/or the case where X and Y are indirectly connected with another element disposed therebetween. The case where X and Y are indirectly connected may include the case where at least one device (e.g., a switch, a transistor, a capacitor, an inductor, a resistor, a diode, etc.) that enables electrical connection of X and Y is connected between X and Y.

As used herein, the term "ON" used in association with the state of a device may denote an activated state of the device, and the term "OFF" may denote an inactivated state of the device. The term "ON" used in association with a signal received by a device may denote a signal activating the device, and the term "OFF" may denote a signal inactivating the device. A device may be activated by a high-level voltage or a low-level voltage. For example, a P-channel transistor (a P-type transistor) is activated by a low-level voltage, and an N-channel transistor (an N-type transistor) is activated by a high-level voltage. Therefore, it should be understood that "ON" voltages for a P-channel transistor and an N-channel transistor are opposite (low versus high) voltage levels. Hereinafter, a voltage for activating (turning on) a transistor is referred to as a gate on voltage, and a voltage for inactivating (turning off) a transistor is referred to as a gate off voltage.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
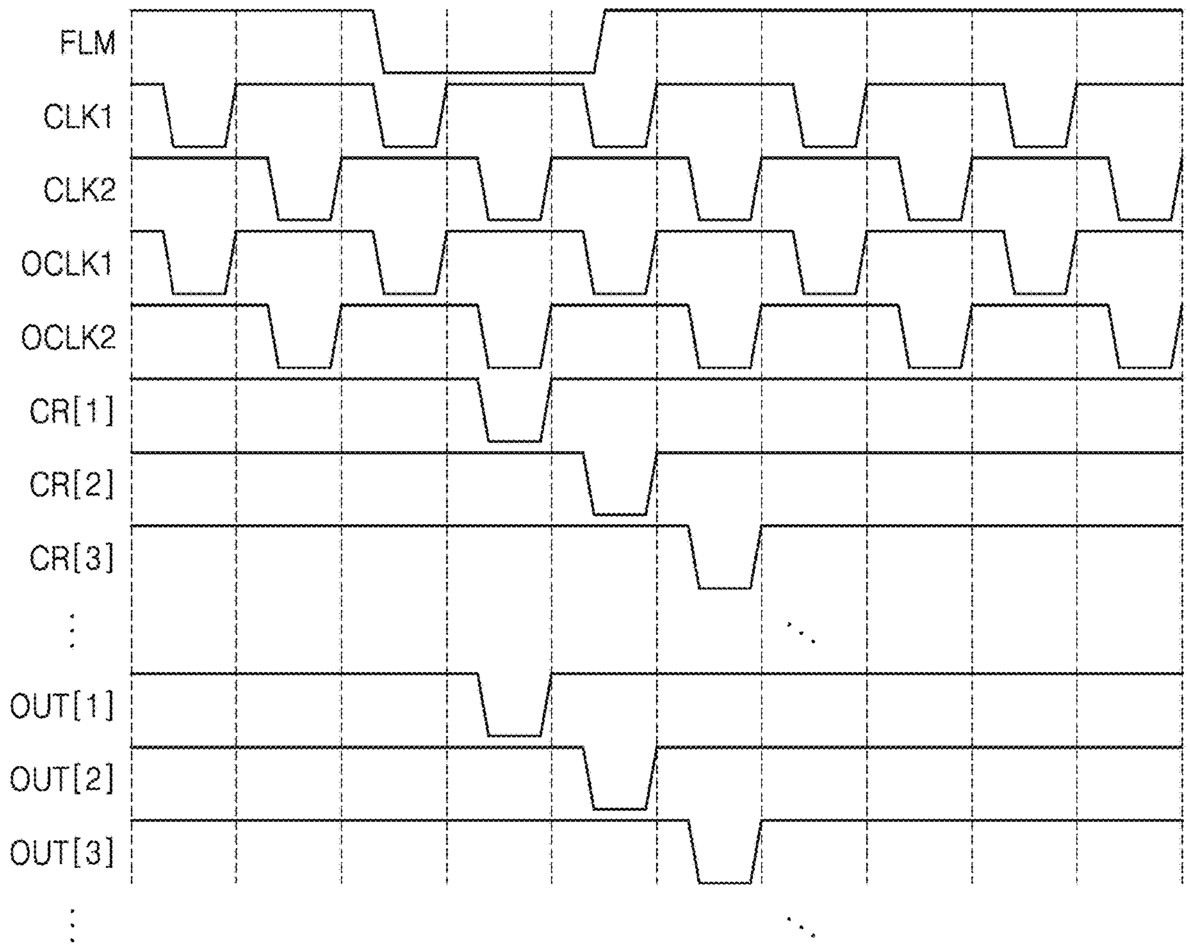
FIG. 2 is a diagram schematically showing input/output signals of a driving circuit according to an embodiment.
Figure 3A:
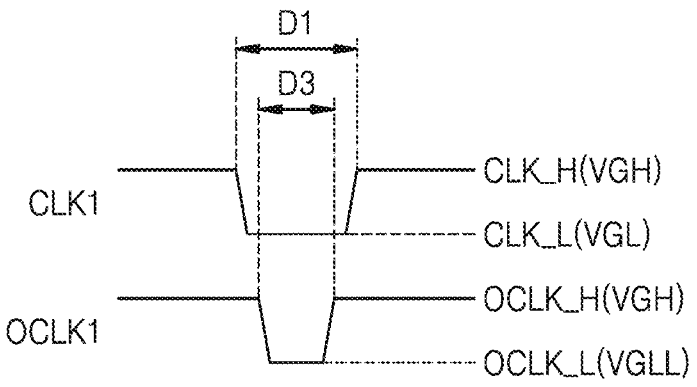
FIGS. 3A and 3B are schematic diagrams of clock signals according to an embodiment.
Figure 3B:
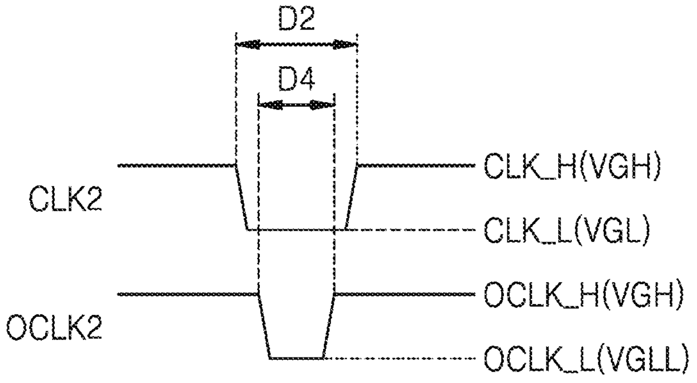

FIG. 1 is a schematic diagram of a driving circuit DRV according to an embodiment. FIG. 2 is a diagram schematically showing input/output signals of a driving circuit according to an embodiment. FIGS. 3A and 3B are schematic diagrams of clock signals according to an embodiment.

Referring to FIG. 1, the driving circuit DRV according to an embodiment may include a plurality of stages ST1 to STn. The plurality of stages ST1 to STn may sequentially output output signals OUT[1], OUT[2], OUT[3], OUT[4], . . . , OUT[n] to signal lines.

Each of the stages ST1 to STn may include a plurality of terminals to which a plurality of signals are input and/or output. The plurality of signals may include a clock signal and a voltage signal. The plurality of terminals may include an input terminal IN, a first voltage input terminal V1, a second voltage input terminal V2, a first clock terminal CK1, a second clock terminal CK2, a third clock terminal OCK1, a fourth clock terminal OCK2, a first output terminal GOUT, and a second output terminal COUT.

A start signal may be input (supplied) to the input terminal IN. The plurality of stages ST1 to STn may output the output signals OUT[1], OUT[2], OUT[3], OUT[4], . . . , OUT[n], respectively, in response to the start signal. The start signal may be an external signal FLM or carry signals CR[1], CR[2], CR[3], CR[4], . . . , CR[n−1]. The external signal FLM may be input as a start signal to the input terminal IN of a first stage ST1, and a carry signal output from a previous stage (hereinafter, ‘a previous carry signal’) may be input as a start signal to the input terminal IN of each of second to n-th stages ST2 to STn. The previous stage may be a stage at least one preceding stage from a current stage. FIG. 1 shows an embodiment in which the previous stage is an immediately preceding stage. In an embodiment, for example, the carry signal CR[3] output from the third stage ST3 may be input as a start signal to the input terminal IN of the fourth stage ST4. The carry signal CR[n] output from the n-th stage STn may be input to an input terminal IN of a dummy stage (not shown).

A first voltage VGH may be input to the first voltage input terminal V1, and a second voltage VGLL may be input to the second voltage input terminal V2. The second voltage VGLL may be a voltage lower than the first voltage VGH.

A first clock signal CLK1 or a second clock signal CLK2 may be input to the first clock terminal CK1 and the second clock terminal CK2. The first clock signal CLK1 and the second clock signal CLK2 may be alternately input to first clock terminals CK1 of the stages ST1 to STn. The second clock signal CLK2 and the first clock signal CLK1 may be alternately input to second clock terminals CK2 of the stages ST1 to STn. In an embodiment, the first clock signal CLK1 and the second clock signal CLK2 may be input to the first clock terminal CK1 and the second clock terminal CK2 of the odd-numbered stages ST1, ST3, . . . , respectively. The second clock signal CLK2 and the first clock signal CLK1 may be input to the first clock terminal CK1 and the second clock terminal CK2 of the even-numbered stages ST2, ST4, . . . , respectively. In an embodiment, the second clock signal CLK2 and the first clock signal CLK1 may be input to the first clock terminal CK1 and the second clock terminal CK2 of the odd-numbered stages ST1, ST3, . . . , respectively. The first clock signal CLK1 and the second clock signal CLK2 may be input to the first clock terminal CK1 and the second clock terminal CK2 of the even-numbered stages ST2, ST4, . . . , respectively.

A third clock signal OCLK1 or a fourth clock signal OCLK2 may be input to the third clock terminal OCK1 and the fourth clock terminal OCK2. The third clock signal OCLK1 and the fourth clock signal OCLK2 may be alternately input to third clock terminals OCK1 of the stages ST1 to STn. The fourth clock signal OCLK2 and the third clock signal OCLK1 may be alternately input to fourth clock terminals OCK2 of the stages ST1 to STn. In an embodiment, the third clock signal OCLK1 and the fourth clock signal OCLK2 may be input to the third clock terminal OCK1 and the fourth clock terminal OCK2 of the odd-numbered stages ST1, ST3, . . . , respectively. The fourth clock signal OCLK2 and the third clock signal OCLK1 may be input to the third clock terminal OCK1 and the fourth clock terminal OCK2 of the even-numbered stages ST2, ST4, . . . , respectively. In an embodiment, the fourth clock signal OCLK2 and the third clock signal OCLK1 may be input to the third clock terminal OCK1 and the fourth clock terminal OCK2 of the odd-numbered stages ST1, ST3, . . . , respectively. The third clock signal OCLK1 and the fourth clock signal OCLK2 may be input to the third clock terminal OCK1 and the fourth clock terminal OCK2 of the even-numbered stages ST2, ST4, . . . , respectively.

The first clock signal CLK1 and the second clock signal CLK2 may be square wave signals in which a high-level voltage and a low-level voltage are repeated (swings). The third clock signal OCLK1 and the fourth clock signal OCLK2 may be square wave signals in which a high-level voltage and a low-level voltage are repeated (swings). The first clock signal CLK1 and the second clock signal CLK2 may be phase shifted (phase delayed) signals that have a same waveform and a same period. The second clock signal CLK2 may be input shifted from the first clock signal CLK1 by a half period (a ½ period). The third clock signal OCLK1 and the fourth clock signal OCLK2 may be phase-shifted (phase-delayed) signals that have a same waveform and the same period. The fourth clock signal OCLK2 may be input shifted from the third clock signal OCLK1 by a half period (a ½ period).

A duration during which the first clock signal CLK1 maintains a low-level voltage and a duration during which the third clock signal OCLK1 maintains a low-level voltage may overlap each other. A duration during which the second clock signal CLK2 maintains a low-level voltage and a duration during which the fourth clock signal OCLK2 maintains a low-level voltage may overlap each other. In an embodiment, a duration during which the first clock signal CLK1 is in a level of the third voltage VGL does not overlap a duration during which the fourth clock signal OCLK2 is in a level of the second voltage VGLL, where the duration during which the first clock signal CLK1 is in the level of the third voltage VGL is longer than the duration during which the fourth clock signal OCLK2 is in the level of the second voltage VGLL.

In an embodiment, as shown in FIG. 2, a falling time of the first clock signal CLK1 may be identical to a falling time of the third clock signal OCLK1, and a rising time of the first clock signal CLK1 may be identical to a rising time of the third clock signal OCLK1. A falling time of the second clock signal CLK2 may be identical to a falling time of the fourth clock signal OCLK2, and a rising time of the second clock signal CLK2 may be identical to a rising time of the fourth clock signal OCLK2. A falling edge of the first clock signal CLK1 and a falling edge of the third clock signal OCLK1 may substantially coincide with each other, and a rising edge of the first clock signal CLK1 and a rising edge of the third clock signal OCLK1 may substantially coincide with each other. A falling edge of the second clock signal CLK2 and a falling edge of the fourth clock signal OCLK2 may substantially coincide with each other, and a rising edge of the second clock signal CLK2 and a rising edge of the fourth clock signal OCLK2 may substantially coincide with each other. A duration during which the first clock signal CLK1 is a low-level voltage may be identical to a duration during which the third clock signal OCLK1 is a low-level voltage. A duration during which the second clock signal CLK2 is a low-level voltage may be identical to a duration during which the fourth clock signal OCLK2 is a low-level voltage.

In another embodiment, as shown in FIGS. 3A and 3B, a falling time of the first clock signal CLK1 may precede a falling time of the third clock signal OCLK1, and a rising time of the third clock signal OCLK1 may precede a rising time of the first clock signal CLK1. In such an embodiment, a falling time of the second clock signal CLK2 may precede a falling time of the fourth clock signal OCLK2, and a rising time of the fourth clock signal OCLK2 may precede a rising time of the second clock signal CLK2. A duration D1 during which the first clock signal CLK1 is a low-level voltage may be longer than a duration D3 during which the third clock signal OCLK1 is a low-level voltage. A duration D2 during which the second clock signal CLK2 is a low-level voltage may be longer than a duration D4 during which the fourth clock signal OCLK2 is a low-level voltage.

Referring to FIGS. 3A and 3B, the first clock signal CLK1 and the second clock signal CLK2 may be square wave signals in which a high-level voltage CLK_H of the first voltage VGH and a low-level voltage CLK_L of a third voltage VGL are repeated (that swings between a high-level voltage CLK_H of the first voltage VGH and a low-level voltage CLK_L of a third voltage VGL). The third clock signal OCLK1 and the fourth clock signal OCLK2 may be square wave signals in which a high-level voltage OCLK_H of the first voltage VGH and a low-level voltage OCLK_L of the second voltage VGLL are repeated (that swings between a high-level voltage OCLK_H of the first voltage VGH and a low-level voltage OCLK_L of the second voltage VGLL). The third voltage VGL may be lower than the second voltage VGLL. In an embodiment, for example, the absolute value of the third voltage VGL may be greater than the absolute value of the second voltage VGLL.

In an embodiment, the first clock signal CLK1 and the second clock signal CLK2 and the third clock signal OCLK1 and the fourth clock signal OCLK2 may have a high-level voltage duration that is longer than a low-level voltage duration during one period. In an embodiment, the first clock signal CLK1 and the second clock signal CLK2 and the third clock signal OCLK1 and the fourth clock signal OCLK2 may have a high-level voltage duration and a low-level voltage duration that are the same as each other during one period.

An output signal may be output from the first output terminal GOUT. As shown in FIG. 2, output signals OUT[1], OUT[2], OUT[3], OUT[4], . . . , OUT[n] output from first output terminals GOUT of the stages ST1 to STn may be signals sequentially shifted by a certain interval. In an embodiment, the stages ST1 to STn may generate the output signals OUT[1], OUT[2], OUT[3], OUT[4], . . . , OUT[n] of a low-level voltage shifted from a previous output signal by a ½ period of a clock signal and sequentially output the output signals OUT[1], OUT[2], OUT[3], OUT[4], . . . , OUT[n]. In an embodiment, a high-level voltage and a low-level voltage of the output signals OUT[1] to OUT[n] may be the first voltage VGH and the second voltage VGLL, respectively.

A carry signal may be output from the second output terminal COUT. As shown in FIG. 2, carry signals CR[1], CR[2], CR[3], CR[4], . . . , CR[n] output from second output terminals COUT of the stages ST1 to STn may be sequentially signals shifted by a certain period. In an embodiment, the stages ST1 to STn may generate the carry signals CR[1], CR[2], CR[3], CR[4], . . . , CR[n−1] of a low-level voltage shifted from a previous carry signal by a ½ period of a clock signal and sequentially output the carry signals CR[1], CR[2], CR[3], CR[4], . . . , CR[n−1]. In an embodiment, a high-level voltage and a low-level voltage of the carry signals CR[1], CR[2], CR[3], CR[4], . . . , CR[n−1] may be the first voltage VGH and the third voltage VGL, respectively.

Figure 4:
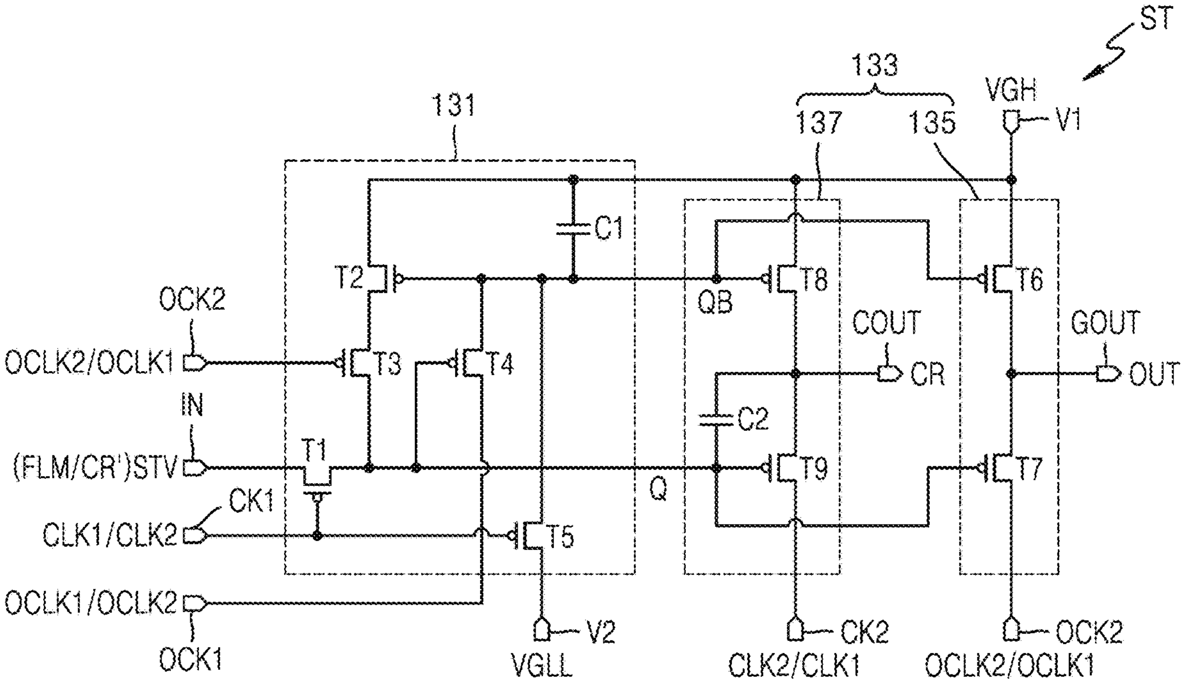
FIG. 4 is a diagram schematically showing an example of a stage included in the driving circuit of FIG. 1.
Figure 5A:
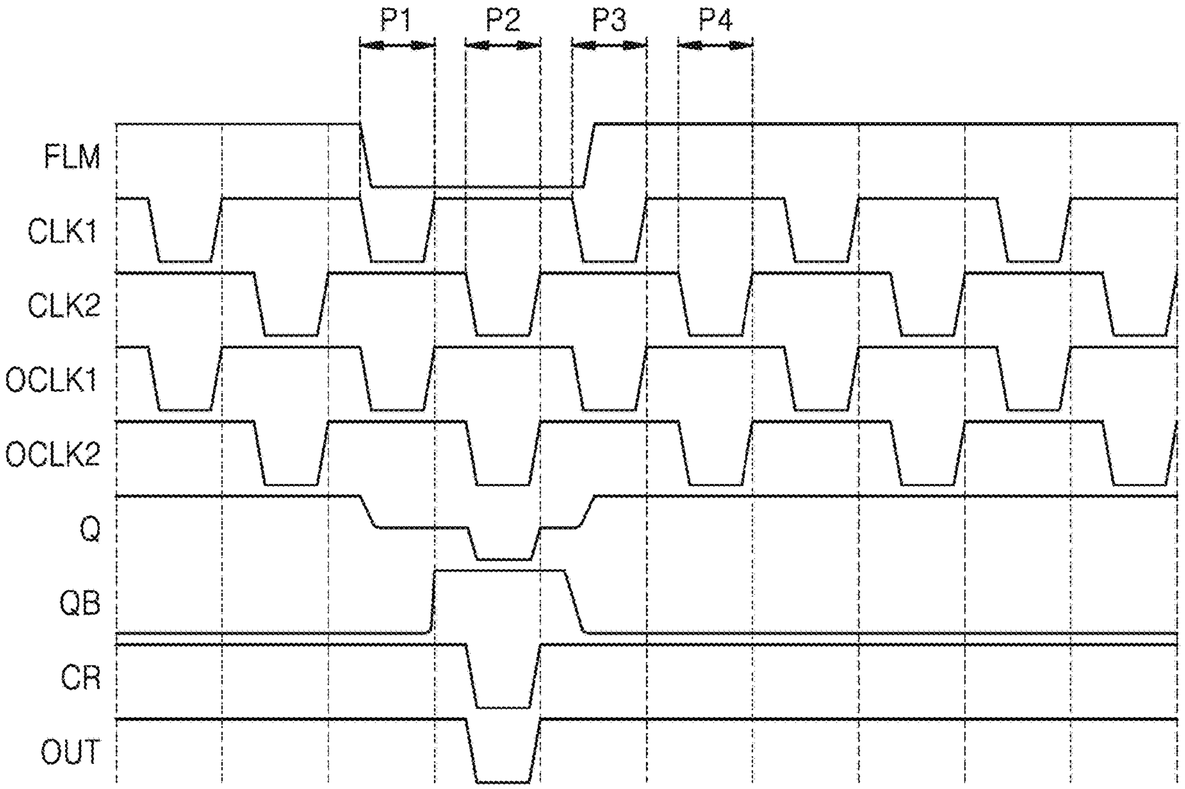
FIGS. 5A and 5B are signal timing diagrams to explain driving of the stage of FIG. 4.
Figure 5B:
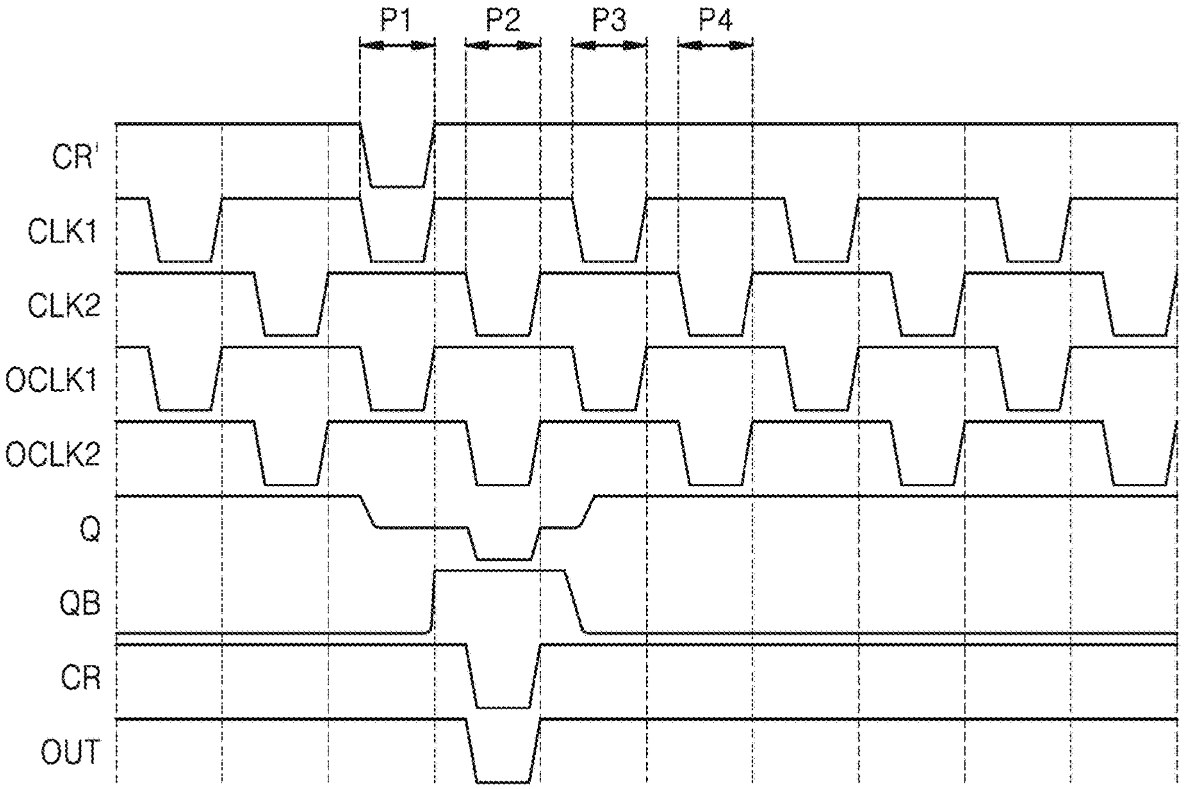

FIG. 4 is a diagram schematically showing an example of a stage ST included in the driving circuit DRV of FIG. 1. FIGS. 5A and 5B are signal timing diagrams to explain driving of the stage ST of FIG. 4.

Referring to FIG. 4, an embodiment of the stage ST may include at least one transistor. In an embodiment, the at least one transistor may be a P-channel transistor. The P-channel transistor may be a silicon transistor. The silicon transistor may include a silicon semiconductor, and the silicon semiconductor may include amorphous silicon, polysilicon, etc. In an embodiment, for example, the silicon transistor may be a low-temperature polycrystalline silicon (LTPS) thin-film transistor. A gate-on voltage of the P-channel transistor may be a low-level voltage, and a gate-off voltage of the P-channel transistor may be a high-level voltage.

The stage ST may include a control circuit 131 and an output circuit 133.

The control circuit 131 may be configured to control voltages of a first node Q and a second node QB based on a signal input to the input terminal IN. The control circuit 131 may include first to fifth transistors T1 to T5. The control circuit 131 may further include a first capacitor C1.

The first transistor T1 may be connected to the input terminal IN and the first node Q. A gate of the first transistor T1 may be connected to the first clock terminal CK1. When a clock signal input to the first clock terminal CK1 is at a low level, the first transistor T1 may be turned on to transmit a start signal STV input to the input terminal IN to the first node Q. The clock signal input to the first clock terminal CK1 may be the first clock signal CLK1 or the second clock signal CLK2. In an embodiment, the first clock signal CLK1 may be input to the first clock terminal CK1 of an odd-numbered stage, and the second clock signal CLK2 may be input to the first clock terminal CK1 of an even-numbered stage.

The second transistor T2 may be connected between the first voltage input terminal V1 and the first node Q. The second transistor T2 may be connected to the first voltage input terminal V1 and the third transistor T3. A gate of the second transistor T2 may be connected to the second node QB. When a voltage of the second node QB is at a low level, the second transistor T2 may be turned on to transfer the first voltage VGH input to the first voltage input terminal V1 to the first node Q through the third transistor T3.

The third transistor T3 may be connected between the first voltage input terminal V1 and the first node Q. The third transistor T3 may be connected to the second transistor T2 and the first node Q. A gate of the third transistor T3 may be connected to the fourth clock terminal OCK2. When a clock signal input to the fourth clock terminal OCK2 is at a low level, the third transistor T3 may be turned on to transfer the first voltage VGH transferred by the second transistor T2 to the first node Q. The clock signal input to the fourth clock terminal OCK2 may be the third clock signal OCLK1 or the fourth clock signal OCLK2. In an embodiment, the fourth clock signal OCLK2 may be input to the fourth clock terminal OCK2 of an odd-numbered stage, and the third clock signal OCLK1 may be input to the fourth clock terminal OCK2 of an even-numbered stage.

The fourth transistor T4 may be connected to the second node QB and the third clock terminal OCK1. A gate of the fourth transistor T4 may be connected to the first node Q. When a voltage of the first node Q is at a low level, the fourth transistor T4 may be turned on to transmit a clock signal input to the third clock terminal OCK1 to the second node QB. In an embodiment, the third clock signal OCLK1 may be input to the third clock terminal OCK1 of an odd-numbered stage, and the fourth clock signal OCLK2 may be input to the third clock terminal OCK1 of an even-numbered stage.

The fifth transistor T5 may be connected to the second node QB and the second voltage input terminal V2. A gate of the fifth transistor T5 may be connected to the first clock terminal CK1. When a clock signal input to the first clock terminal CK1 is at a low level, the fifth transistor T5 may be turned on to transfer the second voltage VGLL input to the second voltage input terminal V2 to the second node QB.

The first capacitor C1 may be connected to the first voltage input terminal V1 and the second node QB. The first capacitor C1 may stably maintain a voltage of the second node QB.

The output circuit 133 may include a first output circuit 135 and a second output circuit 137.

The first output circuit 135 may be connected between the first voltage input terminal V1 and the fourth clock terminal OCK2. The first output circuit 135 may output an output signal OUT of a high-level voltage or a low-level voltage through the first output terminal GOUT based on voltages of the first node Q and the second node QB. The first output circuit 135 may include a sixth transistor T6 and a seventh transistor T7.

The sixth transistor T6 may be connected to the first voltage input terminal V1 and the first output terminal GOUT. A gate of the sixth transistor T6 may be connected to the second node QB. The sixth transistor T6 may be a pull-up transistor configured to transfer a high-level voltage to the first output terminal GOUT. When a voltage of the second node QB is at a low level, the sixth transistor T6 may be turned on to transfer the first voltage VGH, which is a high-level voltage input to the first voltage input terminal V1, to the first output terminal GOUT.

The seventh transistor T7 may be connected to the first output terminal GOUT and the fourth clock terminal OCK2. A gate of the seventh transistor T7 may be connected to the first node Q. The seventh transistor T7 may be a pull-down transistor configured to transfer a low-level voltage to the first output terminal GOUT. When a voltage of the first node Q is at a low level, the seventh transistor T7 may be turned on to transmit a clock signal input to the fourth clock terminal OCK2 to the first output terminal GOUT. In an embodiment, the fourth clock signal OCLK2 may be input to the fourth clock terminal OCK2 of an odd-numbered stage, and the third clock signal OCLK1 may be input to the fourth clock terminal OCK2 of an even-numbered stage.

The second output circuit 137 may be connected between the first voltage input terminal V1 and the second clock terminal CK2. The second output circuit 137 may output a carry signal CR of a high-level voltage or a low-level voltage through the second output terminal COUT based on voltages of the first node Q and the second node QB. The second output circuit 137 may include an eighth transistor T8 and a ninth transistor T9. The second output circuit 137 may further include a second capacitor C2.

The eighth transistor T8 may be connected to the first voltage input terminal V1 and the second output terminal COUT. A gate of the eighth transistor T8 may be connected to the second node QB. The eighth transistor T8 may be a pull-up transistor configured to transfer a high-level voltage to the second output terminal COUT. When a voltage of the second node QB is at a low level, the eighth transistor T8 may be turned on to transfer the first voltage VGH, which is a high-level voltage input to the first voltage input terminal V1, to the second output terminal COUT.

The ninth transistor T9 may be connected to the second output terminal COUT and the second clock terminal CK2. A gate of the ninth transistor T9 may be connected to the first node Q. The ninth transistor T9 may be a pull-down transistor configured to transfer a low-level voltage to the second output terminal COUT. When a voltage of the first node Q is at a low level, the ninth transistor T9 may be turned on to transmit a clock signal input to the second clock terminal CK2 to the second output terminal COUT. In an embodiment, the second clock signal CLK2 may be input to the second clock terminal CK2 of an odd-numbered stage, and the first clock signal CLK1 may be input to the second clock terminal CK2 of an even-numbered stage.

The second capacitor C2 may be connected between the second output terminal COUT and the first node Q. The second capacitor C2 may cause a voltage change of the first node Q in connection with a voltage change of the second output terminal COUT through coupling when the first node Q is in a floating state. When a voltage of the second output terminal COUT falls from high level to low level, a low-level voltage of the first node Q may fall due to coupling of the second capacitor C2. When a voltage of the second output terminal COUT rises from low level to high level, a low-level voltage of the first node Q may rise due to coupling of the second capacitor C2.

Hereinafter, an operation of the stage ST shown in FIG. 4 will be described with reference to FIGS. 5A and 5B. FIG. 5A is a timing diagram to explain driving of the stage ST of FIG. 4 when a start signal is the external signal FLM. FIG. 5B is a timing diagram to explain driving of the stage ST of FIG. 4 when a start signal is the previous carry signal CR'.

Hereinafter, an operation of an embodiment of the stage ST in which the first clock signal CLK1 is input to the first clock terminal CK1 of the stage ST, the second clock signal CLK2 is input to the second clock terminal CK2, the third clock signal OCLK1 is input to the third clock terminal OCK1, and the fourth clock signal OCLK2 is input to the fourth clock terminal OCK2 will be described.

During a first period P1, the start signal STV (e.g., the external signal FLM of FIG. 5A or a previous carry signal CR' of FIG. 5B) of a low level may be input to the input terminal IN, the first clock signal CLK1 of a low level may be input to the first clock terminal CK1, the second clock signal CLK2 of a high level may be input to the second clock terminal CK2, the third clock signal OCLK1 of a low level may be input to the third clock terminal OCK1, and the fourth clock signal OCLK2 of a high level may be input to the fourth clock terminal OCK2.

Accordingly, the third transistor T3 may be turned off by the fourth clock signal OCLK2 of a high level, and the first transistor T1 may be turned on by the first clock signal CLK1 of a low level. The start signal STV of a low level may be transmitted to the first node Q by the turned-on first transistor T1, and a voltage of the first node Q may be a low-level voltage. The seventh transistor T7 and the ninth transistor T9 each having a gate connected to the first node Q may be turned on.

The fifth transistor T5 may be turned on by the first clock signal CLK1 of a low level, and the second voltage VGLL may be transferred to the second node QB by the turned-on fifth transistor T5. The fourth transistor T4 having a gate connected to the first node Q may be turned on, and the third clock signal OCLK1 of a low level may be transmitted to the second node QB by the turned-on fourth transistor T4. Accordingly, a voltage of the second node QB may be a low-level voltage. The second transistor T2, the sixth transistor T6, and the eighth transistor T8 each having a gate connected to the second node QB may be turned on.

The first voltage VGH of a high level may be transferred to the first output terminal GOUT by the turned-on sixth transistor T6, and the fourth clock signal OCLK2 of a high level may be transmitted to the first output terminal GOUT by the turned-on seventh transistor T7. Accordingly, the output signal OUT of a high level may be output from the first output terminal GOUT.

The first voltage VGH of a high level may be transferred to the second output terminal COUT by the turned-on eighth transistor T8, and the second clock signal CLK2 of a high level may be transmitted to the second output terminal COUT by the turned-on ninth transistor T9. Accordingly, the carry signal CR of a high level may be output from the second output terminal COUT.

During a period between the first period P1 and a second period P2, the external signal FLM of a low level or the previous carry signal CR' of a high level may be input to the input terminal IN, the first clock signal CLK1 of a high level may be input to the first clock terminal CK1, the second clock signal CLK2 of a high level may be input to the second clock terminal CK2, the third clock signal OCLK1 of a high level may be input to the third clock terminal OCK1, and the fourth clock signal OCLK2 of a high level may be input to the fourth clock terminal OCK2.

Accordingly, the third transistor T3 may be turned off by the fourth clock signal OCLK2 of a high level, and the first transistor T1 may be turned off by the first clock signal CLK1 of a high level. Regardless of a voltage level of the start signal STV, a voltage of the first node Q may maintain a low-level voltage of a previous period (e.g., the first period P1). The fourth transistor T4, the seventh transistor T7, and the ninth transistor T9 each having a gate connected to the first node Q may be turned on.

The fifth transistor T5 may be turned off by the first clock signal CLK1 of a high level, the third clock signal OCLK1 of a high level may be transmitted to the second node QB by the turned-on fourth transistor T4, and a voltage of the second node QB may be a high-level voltage. The sixth transistor T6 and the eighth transistor T8 each having a gate connected to the second node QB may be turned off.

The fourth clock signal OCLK2 of a high level may be transmitted to the first output terminal GOUT by the turned-on seventh transistor T7. Accordingly, the output signal OUT of a high level may be output from the first output terminal GOUT. The second clock signal CLK2 of a high level may be transmitted to the second output terminal COUT by the ninth transistor T9 having a gate connected to the first node Q. Accordingly, the carry signal CR of a high level may be output from the second output terminal COUT.

During the second period P2, the external signal FLM of a low level or the previous carry signal CR' of a high level may be input to the input terminal IN, the first clock signal CLK1 of a high level may be input to the first clock terminal CK1, the second clock signal CLK2 of a low level may be input to the second clock terminal CK2, the third clock signal OCLK1 of a high level may be input to the third clock terminal OCK1, and the fourth clock signal OCLK2 of a low level may be input to the fourth clock terminal OCK2.

Accordingly, the first transistor T1 may be maintained in a turned-off state by the first clock signal CLK1 of a high level, and regardless of a voltage level of the start signal STV, a voltage of the first node Q may maintain a low-level voltage of the first period P1. The third clock signal OCLK1 of a high level may be transmitted to the second node QB by the fourth transistor T4 having a gate connected to the first node Q, and a voltage of the second node QB may be a high-level voltage. The sixth transistor T6 and the eighth transistor T8 each having a gate connected to the second node QB may be turned off.

The fourth clock signal OCLK2 of a low level may be transmitted to the first output terminal GOUT by the seventh transistor T7 having a gate connected to the first node Q. Accordingly, the output signal OUT of a low level may be output from the first output terminal GOUT. The second clock signal CLK2 of a low level may be transmitted to the second output terminal COUT by the ninth transistor T9 having a gate connected to the first node Q. Accordingly, the carry signal CR of a low level may be output from the second output terminal COUT. As a voltage of the second output terminal COUT falls from high level to low level, the first node Q may be bootstrapped downward by coupling of the second capacitor C2, and thus, a voltage level of the first node Q may further fall.

During a period between the second period P2 and a third period P3, the external signal FLM of a low level or the previous carry signal CR' of a high level may be input to the input terminal IN, the first clock signal CLK1 of a high level may be input to the first clock terminal CK1, the second clock signal CLK2 of a high level may be input to the second clock terminal CK2, the third clock signal OCLK1 of a high level may be input to the third clock terminal OCK1, and the fourth clock signal OCLK2 of a high level may be input to the fourth clock terminal OCK2. An operation of the stage ST between the second period P2 and the third period P3 is similar to that of the stage ST between the first period P1 and the second period P2, and thus, any repetitive detailed description thereof will be omitted.

During the period between the second period P2 and the third period P3, the output signal OUT of a high level may be output from the first output terminal GOUT, and the carry signal CR of a high level may be output from the second output terminal COUT. As a voltage of the second output terminal COUT rises from low level to high level, a voltage of the first node Q may rise due to coupling of the second capacitor C2, and thus, a voltage level of the first node Q may rise.

During the third period P3, the start signal STV (the external signal FLM or the previous carry signal CR') of a high level may be input to the input terminal IN, the first clock signal CLK1 of a low level may be input to the first clock terminal CK1, the second clock signal CLK2 of a high level may be input to the second clock terminal CK2, the third clock signal OCLK1 of a low level may be input to the third clock terminal OCK1, and the fourth clock signal OCLK2 of a high level may be input to the fourth clock terminal OCK2.

Accordingly, the third transistor T3 may be turned off by the fourth clock signal OCLK2 of a high level, and the first transistor T1 may be turned on by the first clock signal CLK1 of a low level. The start signal STV of a high level may be transmitted to the first node Q by the turned-on first transistor T1, and a voltage of the first node Q may be a high-level voltage. The seventh transistor T7 and the ninth transistor T9 each having a gate connected to the first node Q may be turned off.

The fourth transistor T4 having a gate connected to the first node Q may be turned off, and the fifth transistor T5 may be turned on by the first clock signal CLK1 of a low level. The second voltage VGLL may be transferred to the second node QB by the turned-on fifth transistor T5, and a voltage of the second node QB may be a low-level voltage. The second transistor T2, the sixth transistor T6, and the eighth transistor T8 each having a gate connected to the second node QB may be turned on.

The first voltage VGH of a high level may be transferred to the first output terminal GOUT by the turned-on sixth transistor T6, and the output signal OUT of a high level may be output from the first output terminal GOUT. The first voltage VGH of a high level may be transferred to the second output terminal COUT by the turned-on eighth transistor T8, and the carry signal CR of a high level may be output from the second output terminal COUT.

During a period between the third period P3 and a fourth period P4, the start signal STV (the external signal FLM or the previous carry signal CR') of a high level may be input to the input terminal IN, the first clock signal CLK1 of a high level may be input to the first clock terminal CK1, the second clock signal CLK2 of a high level may be input to the second clock terminal CK2, the third clock signal OCLK1 of a high level may be input to the third clock terminal OCK1, and the fourth clock signal OCLK2 of a high level may be input to the fourth clock terminal OCK2.

Accordingly, the third transistor T3 may be turned off by the fourth clock signal OCLK2 of a high level, and the first transistor T1 may be turned off by the first clock signal CLK1 of a high level. A voltage of the first node Q may maintain a high-level voltage of a previous period (e.g., the third period P3). The fourth transistor T4, the seventh transistor T7, and the ninth transistor T9 each having a gate connected to the first node Q may be turned off.

The fifth transistor T5 may be turned off by the first clock signal CLK1 of a high level, and a voltage of the second node QB may maintain a low-level voltage of a previous period (e.g., the third period P3). The second transistor T2, the sixth transistor T6, and the eighth transistor T8 each having a gate connected to the second node QB may be turned on.

The first voltage VGH of a high level may be transferred to the first output terminal GOUT by the turned-on sixth transistor T6, and the output signal OUT of a high level may be output from the first output terminal GOUT. The first voltage VGH of a high level may be transferred to the second output terminal COUT by the turned-on eighth transistor T8, and the carry signal CR of a high level may be output from the second output terminal COUT.

During the fourth period P4, the start signal STV (the external signal FLM or the previous carry signal CR') of a high level may be input to the input terminal IN, the first clock signal CLK1 of a high level may be input to the first clock terminal CK1, the second clock signal CLK2 of a low level may be input to the second clock terminal CK2, the third clock signal OCLK1 of a high level may be input to the third clock terminal OCK1, and the fourth clock signal OCLK2 of a low level may be input to the fourth clock terminal OCK2.

Accordingly, the first transistor T1 may be turned off by the first clock signal CLK1 of a high level, and a voltage of the first node Q may maintain a high-level voltage of a previous period. The fourth transistor T4, the seventh transistor T7, and the ninth transistor T9 each having a gate connected to the first node Q may be turned off.

The fifth transistor T5 may be turned off by the first clock signal CLK1 of a high level, and a voltage of the second node QB may maintain a low-level voltage of a previous period.

The second transistor T2 having a gate connected to the second node QB may be turned on, and the third transistor T3 may be turned on by the fourth clock signal OCLK2 of a low level. The first voltage VGH may be transferred to the first node Q by the turned-on second transistor T2 and third transistor T3, and a voltage of the first node Q may be stably maintained as a high-level voltage.

The sixth transistor T6 and the eighth transistor T8 each having a gate connected to the second node QB may be turned on. The first voltage VGH of a high level may be transferred to the first output terminal GOUT by the turned-on sixth transistor T6, and the output signal OUT of a high level may be output from the first output terminal GOUT. The first voltage VGH of a high level may be transferred to the second output terminal COUT by the turned-on eighth transistor T8, and the carry signal CR of a high level may be output from the second output terminal COUT.

Figure 6:
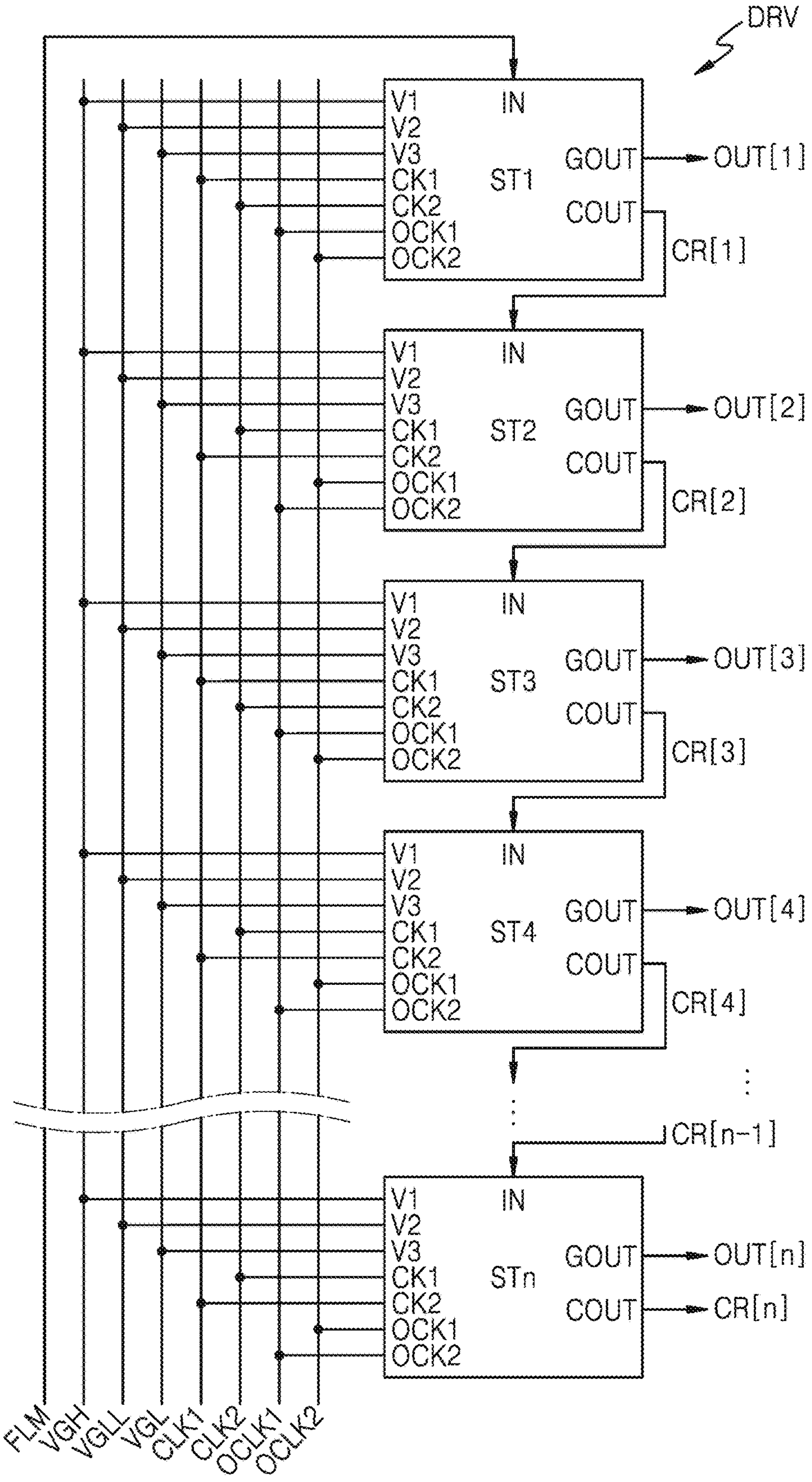
FIG. 6 is a schematic diagram of a driving circuit according to an embodiment.
Figure 7:
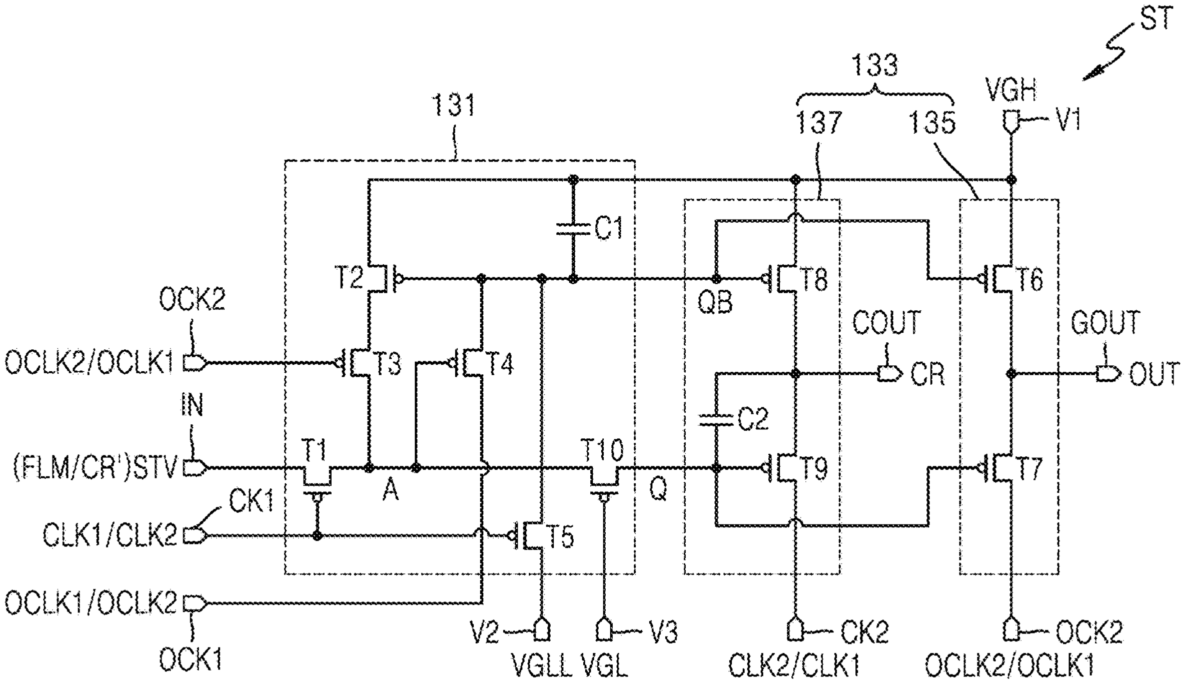
FIG. 7 is a diagram schematically showing an example of a stage included in the driving circuit of FIG. 6.
Figure 8A:
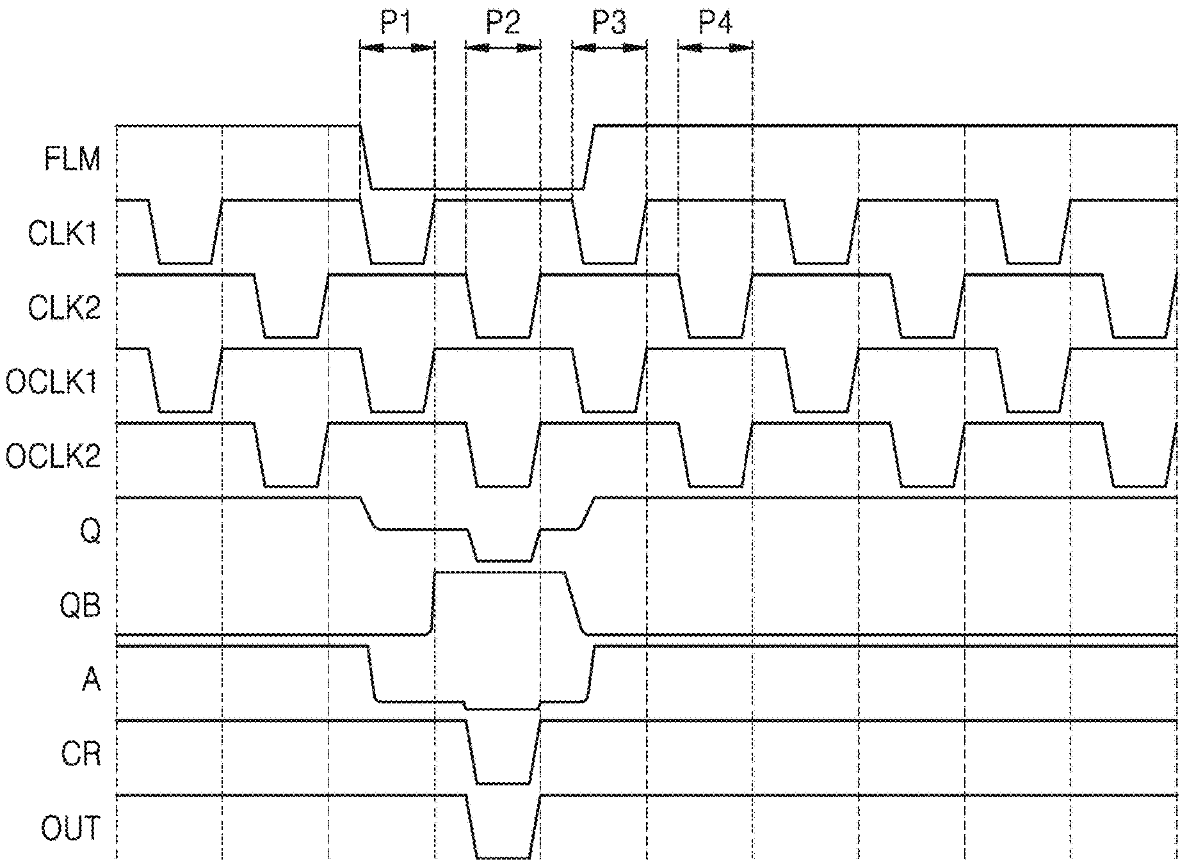
FIGS. 8A and 8B are signal timing diagrams to explain driving of the stage of FIG. 7.
Figure 8B:
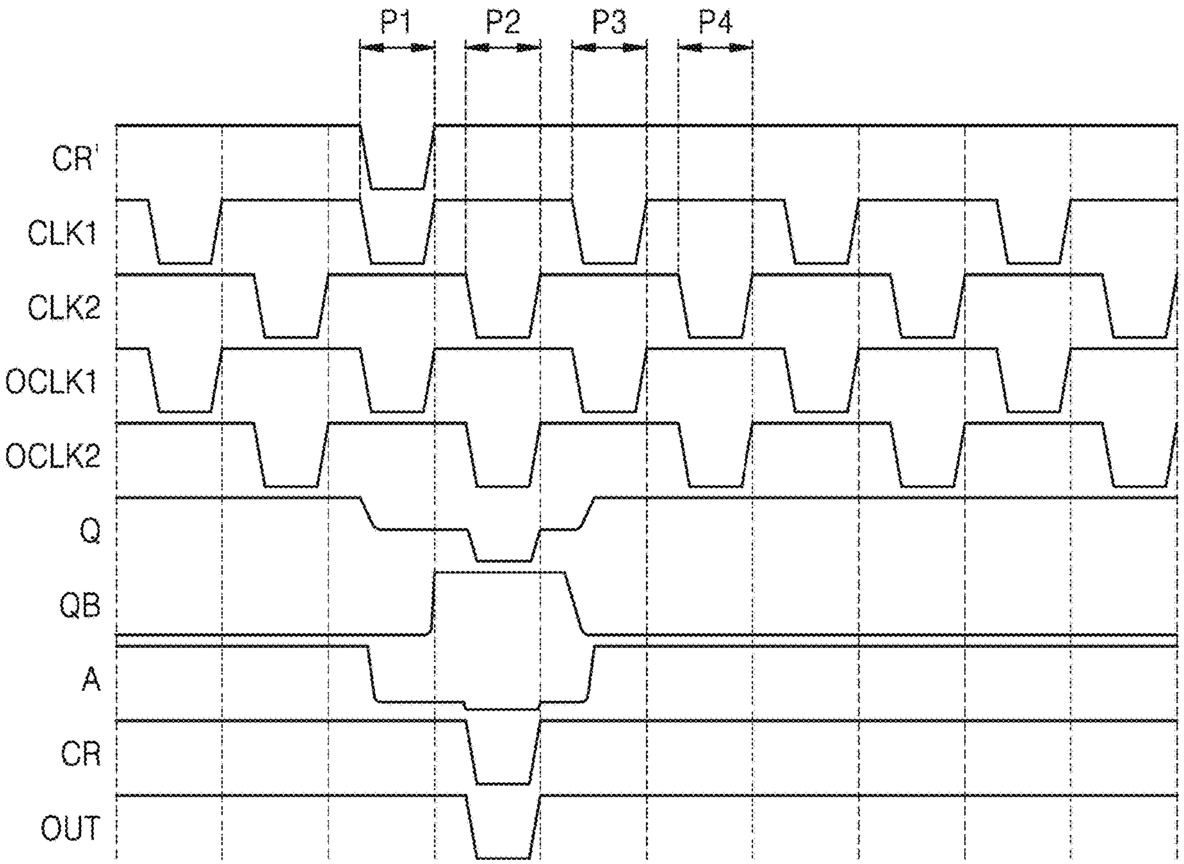

FIG. 6 is a schematic diagram of the driving circuit DRV according to an embodiment. FIG. 7 is a diagram schematically showing an example of the stage ST included in the driving circuit DRV of FIG. 6. FIGS. 8A and 8B are signal timing diagrams to explain driving of the stage ST of FIG. 7. For convenience of description, elements different from those described above with reference to FIGS. 1 to 5B are mainly described below.

The driving circuit DRV shown in FIG. 6 is substantially the same as the driving circuit DRV shown in FIG. 1 except that each of the plurality of stages ST1 to STn of the driving circuit DRV further includes a third voltage input terminal V3 as shown in FIG. 6. The third voltage VGL may be input to the third voltage input terminal V3, and the third voltage VGL may be lower than the second voltage VGLL.

In an embodiment, as shown in FIG. 7, the control circuit 131 of each of the plurality of stages ST1 to STn may further include a P-channel tenth transistor T10. The configuration and operation of the stage ST shown in FIG. 7 other than the tenth transistor T10 is the same as those of the stage ST shown in FIG. 4.

In such an embodiment, the tenth transistor T10 may be connected between a third node A and the first node Q. The tenth transistor T10 may be connected to the first transistor T1 and the first node Q. A gate of the tenth transistor T10 may be connected to the third voltage input terminal V3. The tenth transistor T10 may be turned on by the third voltage VGL input to the third voltage input terminal V3 and may be configured to transmit a signal transmitted to the third node A to the first node Q.

FIG. 8A is a timing diagram to explain driving of the stage ST of FIG. 7 when a start signal is the external signal FLM. FIG. 8B is a timing diagram to explain driving of the stage ST of FIG. 7 when a start signal is the previous carry signal CR'. Referring to FIGS. 8A and 8B, the voltage changes of signals or nodes shown in FIGS. 8A and 8B are substantially the same as those of FIGS. 5A and 5B except that a voltage change of the third node A is added as the tenth transistor T10 is added to a stage.

During the first period P1, a voltage of the third node A may be a low-level voltage of the start signal STV transferred to the first node Q by the turned-on first transistor T1. From after the first period P1 to before the third period P3, the voltage of the third node A may maintain a low-level voltage of a previous period (e.g., the first period P1) due to the turned-off first transistor T1. During the third period P3, the voltage of the third node A may be a high-level voltage of the start signal STV transferred to the first node Q by the turned-on first transistor T1. During a period between the third period P3 and the fourth period P4, the voltage of the third node A may maintain a high-level voltage of a previous period (e.g., the third period P3) due to the turned-off first transistor T1.

Figure 9:
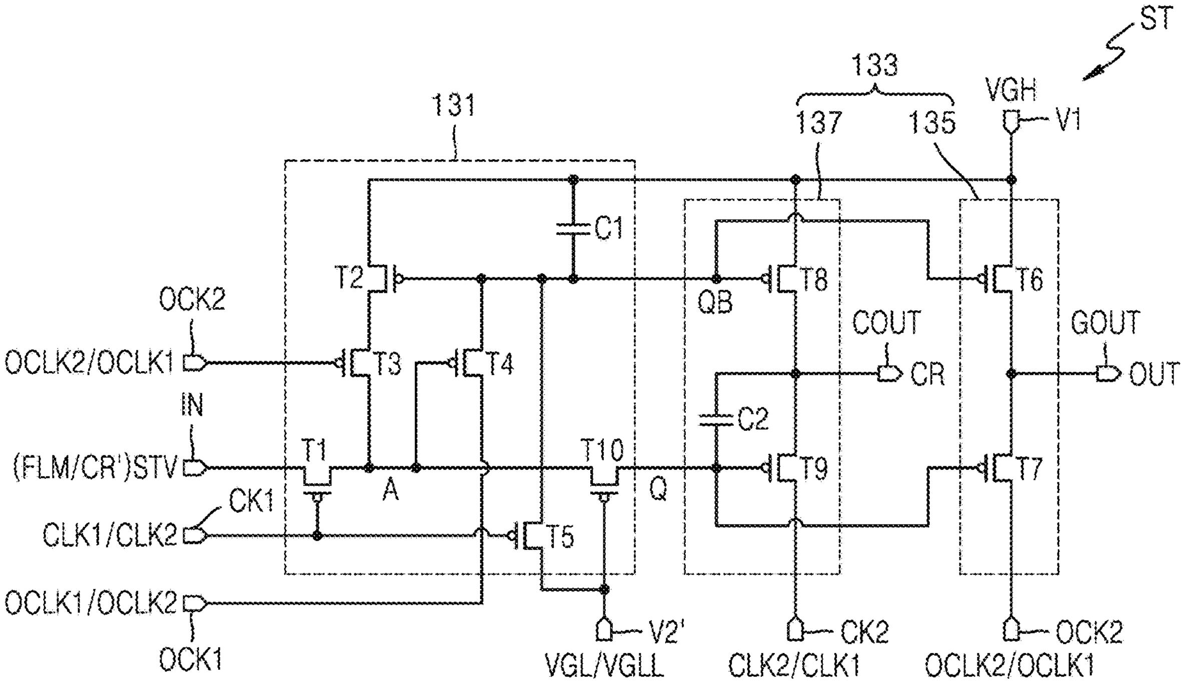
FIG. 9 is a diagram schematically showing an example of a stage according to an embodiment.

FIG. 9 is a diagram schematically showing an example of the stage ST according to an embodiment.

Referring to FIG. 9, in an embodiment, the fifth transistor T5 may be connected to the second node QB and a second voltage input terminal V2', and a gate of the tenth transistor T10 may be connected to the second voltage input terminal V2'. The second voltage VGLL or the third voltage VGL may be input to the second voltage input terminal V2'. In an embodiment of the stage ST, as shown in FIG. 9, the second voltage VGLL or the third voltage VGL is input to the second voltage input terminal V2', and accordingly, power and a non-display area may be reduced by reducing voltage signals and voltage lines compared to the stage ST shown in FIGS. 6 and 7. An operation of the stage ST shown in FIG. 9 is the same as that of the stage ST shown in FIG. 7, and any repetitive detailed description thereof will be omitted.

Figure 10:
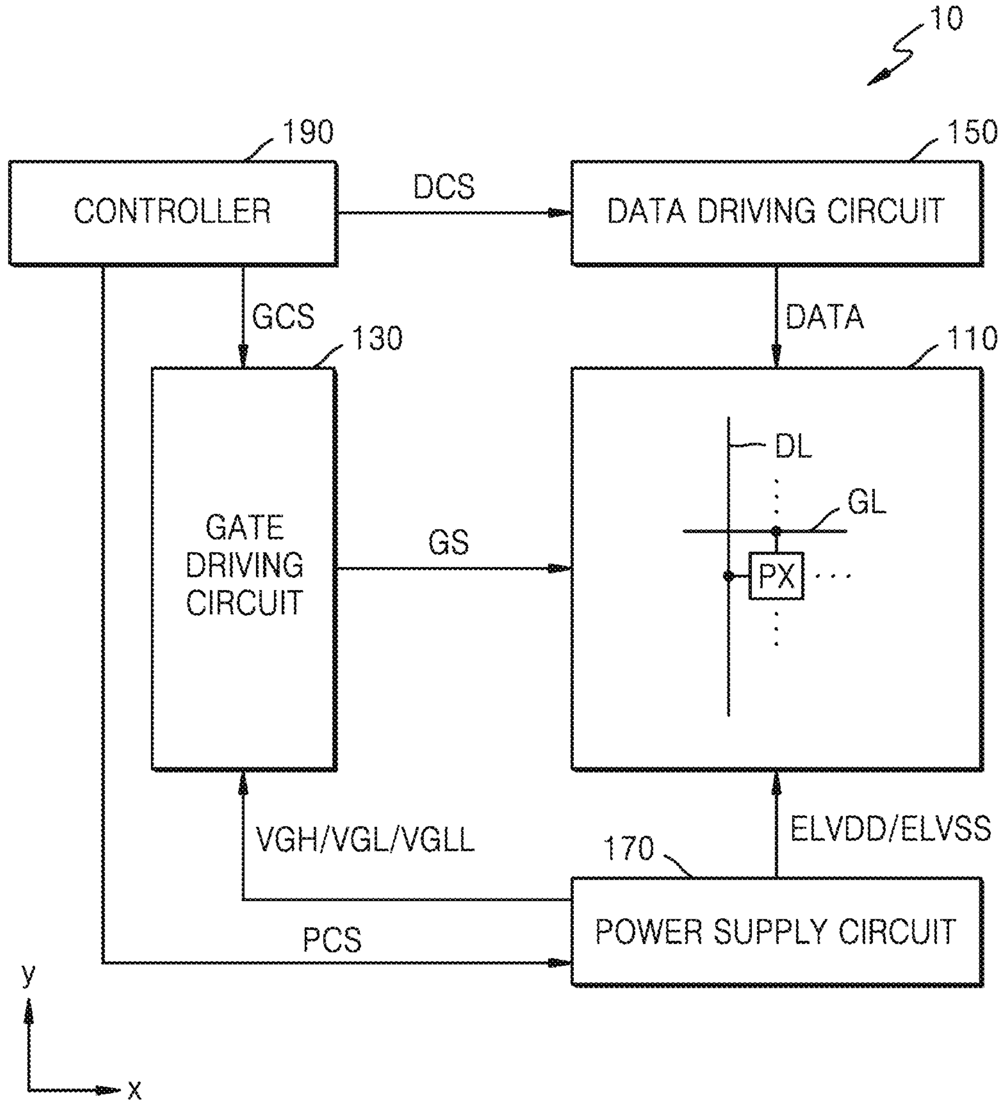
FIG. 10 is a schematic diagram of a display device according to an embodiment.

FIG. 10 is a schematic diagram of a display device 10 according to an embodiment.

The display device 10 is a device that displays a moving image or a still image, and may visually provide information to a user. The display device 10 may be used as the display screen of not only portable electronic devices, such as a mobile phone, a smartphone, a tablet personal computer (PC), a mobile communication terminal, an electronic notebook, an e-book, a portable multimedia player (PMP), a navigation system, and an ultra-mobile PC (UMPC), but also various products, such as a television, a notebook computer, a monitor, a billboard, and the Internet of things (IoT).

The display device 10 according to an embodiment may be a display device, such as an organic light-emitting display, an inorganic light-emitting display (or an inorganic electroluminescent (EL) display), or a quantum dot light-emitting display.

Referring to FIG. 10, the display device 10 according to an embodiment may include a display panel 110. The display panel 110 may include a liquid crystal display panel, an organic light-emitting display panel, or an inorganic light-emitting display panel, and the type of the display panel 110 is not particularly limited. The display panel 110 may be of a rigid type or a flexible type that is rollable or foldable.

A plurality of gate lines GL, a plurality of data lines DL, and a plurality of pixels PX connected thereto may be arranged in the display panel 110. An area where the plurality of pixels PX are arranged may correspond to a display area displaying an image.

The plurality of pixels PX may be repeatedly arranged in a first direction (direction x, row direction) and a second direction (direction y, column direction). The plurality of pixels PX may be arranged in various forms, such as a stripe arrangement, a PenTile® arrangement, a diamond arrangement, and a mosaic arrangement, to display an image. Each of the plurality of pixels PX may include an organic light-emitting diode as a display element, and the organic light-emitting diode may be connected to a pixel circuit. The pixel circuit may include a plurality of transistors and at least one capacitor. The pixel PX may emit, for example, red, green, blue, or white light through an organic light-emitting diode (OLED). Each pixel PX may be connected to a corresponding gate line among the plurality of gate lines GL and a corresponding data line among the plurality of data lines DL.

In an embodiment, the plurality of transistors included in the pixel circuit may be P-channel silicon transistors. In an embodiment, the plurality of transistors included in the pixel circuit may be N-channel oxide transistors. In an embodiment, some of the plurality of transistors included in the pixel circuit may be P-channel silicon transistors, and the others may be N-channel oxide transistors.

Each of the gate lines GL may extend in the direction x (row direction) and may be connected to pixels PX positioned in the same row. Each of the gate lines GL may be configured to transmit a gate signal to the pixels PX of the same row. Each of the data lines DL may extend in the direction y (column direction) and may be connected to pixels PX positioned in the same column. Each of the data lines DL may be configured to transmit a data signal to each of the pixels PX of the same column in synchronization with the gate signal.

Various conductive lines configured to transmit an electrical signal to be applied to the display area, outer driving circuits electrically connected to pixel circuits, and pads to which a printed circuit board or a driver integrated circuit (IC) chip is attached may be positioned in a peripheral area (a non-display area) outside the display area of the display panel 110. In an embodiment, for example, a gate driving circuit 130, a data driving circuit 150, a power supply circuit 170, and a controller 190 may be provided in the peripheral area of the display panel 110.

The gate driving circuit 130 may be connected to the plurality of gate lines GL and may be configured to generate a gate signal GS in response to a gate driving control signal GCS from the controller 190 and sequentially supply the gate signal GS to the gate lines GL. The gate line GL may be connected to a gate of a transistor included in the pixel PX, and the gate signal GS may be a gate control signal for controlling the turn-on and turn-off of a transistor to which a gate line is connected. The gate signal GS may include a gate-on voltage at which the transistor may be turned on and a gate-off voltage at which the transistor may be turned off. The gate driving circuit 130 may include a plurality of stages configured to sequentially generate and output the gate signal GS.

In an embodiment, the gate driving circuit 130 may be implemented as the driving circuit DRV shown in FIG. 1. In an embodiment, for example, the gate signal GS output to each gate line GL by the gate driving circuit 130 may correspond to the output signal OUT of a high level or a low level output to a signal line by each of the plurality of stages ST1 to STn of the driving circuit DRV. Each of the stages ST1 to STn may be connected to the gate line GL arranged in a corresponding row of the display panel 110. Each of the stages ST1 to STn may generate the gate signal GS as the output signal OUT and output the gate signal GS to the connected gate line GL. That is, each of the stages ST1 to STn may supply the gate signal GS of a high level or low level to the gate line GL provided in the corresponding row. In an embodiment, each of the stages ST1 to STn of the gate driving circuit 130 may be the stage ST shown in FIG. 4 or the stage ST shown in FIG. 7 described above.

The number of stages constituting the gate driving circuit 130 according to one or more embodiments may be variously modified according to the number of rows (horizontal lines) provided in the display area.

The data driving circuit 150 may be connected to the plurality of data lines DL and may be configured to supply a data signal DATA to the data lines DL in response to a data driving control signal DCS from the controller 190. The data signal DATA supplied to the data lines DL may be supplied to the pixels PX to which the gate signal GS is supplied. The data driving circuit 150 may be configured to convert input image data having a gray scale input from the controller 190 into the data signal DATA in the form of voltage or current.

The power supply circuit 170 may be configured to generate signals (voltage and current) used to drive the pixels PX in response to a power driving control signal PCS from the controller 190. The power supply circuit 170 may be configured to supply power to elements of an electronic device. The power supply circuit 170 may include a power management integrated circuit (PMIC). The PMIC may be configured to supply optimized power to each element of an electronic device.

In an embodiment where the display device 10 is an organic light-emitting display, the power supply circuit 170 may be configured to generate a first power voltage ELVDD and a second power voltage ELVSS and supply the first power voltage ELVDD and the second power voltage ELVSS to the pixels PX. The first power voltage ELVDD may be a high-level voltage that is provided to one terminal of a driving transistor connected to a first electrode (a pixel electrode or an anode) of the OLED of each pixel PX. The second power voltage ELVSS may be a low-level voltage that is provided to a second electrode (an opposite electrode or a cathode) of the OLED. The first power voltage ELVDD and the second power voltage ELVSS may be driving voltages that allow the plurality of pixels PX to emit light.

The power supply circuit 170 may be configured to generate the first voltage VGH, the second voltage VGLL, and the third voltage VGL and supply the first voltage VGH, the second voltage VGLL, and the third voltage VGL to the gate driving circuit 130. The power supply circuit 170 may be configured to generate the plurality of clock signals CLK1, CLK2, OCLK1, and OCLK2 (refer to FIG. 2) and the external signal FLM (refer to FIG. 2) and supply the clock signals CLK1, CLK2, OCLK1, and OCLK2 to the gate driving circuit 130. In an embodiment, the plurality of clock signals CLK1, CLK2, OCLK1, OCLK2 (refer to FIG. 2) and the external signal FLM (refer to FIG. 2) may be supplied from the controller 190.

The controller 190 may generate the gate driving control signal GCS, the data driving control signal DCS and the power driving control signal PCS, based on signals input from the outside. The controller 190 may supply the gate driving control signal GCS to the gate driving circuit 130, may supply the data driving control signal DCS to the data driving circuit 150, and may supply the power driving control signal PCS to the power supply circuit 170.

Although FIG. 10 shows an embodiment where the display device 10 includes the power supply circuit 170 and the controller 190 independently of each other, one or more embodiments are not limited thereto. In another embodiment, the power supply circuit 170 may be included in or integrated into the controller 190.

In an embodiment, the gate driving circuit 130, the data driving circuit 150, the power supply circuit 170, and the controller 190 may be mounted on the display panel 110 as driving chips. The data driving circuit 150, the power supply circuit 170, and the controller 190 may each be formed in the form of an individual IC chip or may be formed in the form of a single IC chip, and may be disposed on a flexible printed circuit board (FPCB) electrically connected to a pad disposed on one side of a substrate. In another embodiment, the data driving circuit 150, the power supply circuit 170, and the controller 190 may be directly disposed on a substrate in a chip-on-glass (COG) or chip-on-plastic (COP) manner.

In an embodiment, a portion of the gate driving circuit 130 or the entire gate driving circuit 130 may be directly formed in the peripheral area of a substrate during a process of forming a transistor, which constitutes the pixel circuit, in the display area of the substrate. The gate driving circuit 130 may include an amorphous silicon TFT gate driver circuit (ASG), a low temperature polycrystalline silicon (LTPS) TFT gate driver circuit, or an oxide semiconductor TFT gate driver circuit (OSG) internalized in the display panel 110.

In an embodiment, an electronic device may output various information via the display device 10 in an operating system. When a processor executes an application stored in a memory, the display device 10 may provide application information to a user via a display panel.

An electronic device described herein may be any of various types of devices. The electronic device may include at least one of a portable communication device (e.g., a smartphone), a computer device, a portable multimedia device, a portable medical device, a camera, a wearable device, or a home appliance, for example. An electronic device according to one or more embodiments is not limited to the devices described above.

Each stage of a driving circuit according to one or more embodiments may vary swing widths of a clock signal input to a circuit (e.g., a first output circuit of FIGS. 4, 7, and 9) configured to output a signal to a pixel and a clock signal input to a circuit (e.g., a second output circuit of FIGS. 4, 7, and 9) configured to output a carry signal to a next stage. According to one or more embodiments, power consumption may be reduced by reducing the swing width of a clock signal input to the first output circuit, which has a large load and large proportion of power consumption in the stage, to be smaller than the swing width of a clock signal input to the second output circuit. In such embodiments, power consumption may be further reduced by reducing a swing width of a clock signal input to some (e.g., a third transistor of FIGS. 4, 7, and 9) of the transistors constituting a control circuit.

According to one or more of the above embodiments, a driving circuit from which gate signals may be stably output at low power and a display device and an electronic device including the driving circuit may be provided. The effect of one or more embodiments is not limited thereto and may be variously expanded without departing from the spirit of the disclosure.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A driving circuit comprising a plurality of stages, wherein each of the plurality of stages comprises:

a first transistor connected to an input terminal, to which a start signal is input, and a first node, and comprising a gate connected to a first clock terminal, to which a first clock signal is input; and a second transistor connected to a first output terminal and a second clock terminal, to which a second clock signal is input, and comprising a gate connected to the first node, wherein the second clock signal swings between a first voltage and a second voltage lower than the first voltage, and the first clock signal swings between the first voltage and a third voltage lower than the second voltage.

2. The driving circuit of claim 1, wherein a duration during which the first clock signal is in a level of the third voltage does not overlap a duration during which the second clock signal is in a level of the second voltage, wherein the duration during which the first clock signal is in the level of the third voltage is longer than the duration during which the second clock signal is in the level of the second voltage.

3. The driving circuit of claim 1, wherein each of the plurality of stages further comprises a third transistor connected to a first terminal, to which the first voltage is input, and the first output terminal, and comprising a gate connected to a second node.

4. The driving circuit of claim 3, wherein each of the plurality of stages further comprises:

a fourth transistor connected to the first terminal and a second output terminal, and comprising a gate connected to the second node;

a fifth transistor connected to the second output terminal and a third clock terminal, to which a third clock signal is input, and comprising a gate connected to the first node; and a first capacitor connected to the second output terminal and the first node, wherein the third clock signal swings between the first voltage and the third voltage and is input phase-shifted from the first clock signal by a ½ period.

5. The driving circuit of claim 4, wherein each of the plurality of stages further comprises:

a sixth transistor connected between the first terminal and the first node, and comprising a gate connected to the second node;

a seventh transistor connected between the sixth transistor and the first node, and comprising a gate connected to the second clock terminal;

an eighth transistor connected to the second node and a fourth clock terminal, to which a fourth clock signal is input, and comprising a gate connected to the first node; and a ninth transistor connected to the second node and a second terminal, to which the second voltage is input, and comprising a gate connected to the first clock terminal, wherein the fourth clock signal swings between the first voltage and the second voltage and is input phase-shifted from the second clock signal by a ½ period.

6. The driving circuit of claim 5, wherein each of the plurality of stages further comprises a second capacitor connected to the first terminal and the second node.

7. The driving circuit of claim 6, wherein each of the plurality of stages further comprises a tenth transistor connected to the first transistor and the first node, and comprising a gate connected to a third terminal, to which the third voltage is input.

8. The driving circuit of claim 4, wherein each of the plurality of stages further comprises:

a sixth transistor connected between the first terminal and the first node, and comprising a gate connected to the second node;

a seventh transistor connected between the sixth transistor and the first node, and comprising a gate connected to the second clock terminal;

an eighth transistor connected to the second node and a fourth clock terminal, to which a fourth clock signal is input, and comprising a gate connected to the first node; and a ninth transistor connected to the second node and a second terminal, to which the third voltage is input, and comprising a gate connected to the first clock terminal, wherein the fourth clock signal swings between the first voltage and the second voltage and is input phase-shifted from the second clock signal by a ½ period.

9. The driving circuit of claim 8, wherein each of the plurality of stages further comprises a second capacitor connected to the first terminal and the second node.

10. The driving circuit of claim 9, wherein each of the plurality of stages further comprises a tenth transistor connected to the first transistor and the first node, and comprising a gate connected to the second terminal.

11. A driving circuit comprising a plurality of stages, wherein each of the plurality of stages comprises:

a control circuit which controls voltages of a first node and a second node based on a start signal input to an input terminal;

a first output circuit which outputs an output signal to a pixel of a display area based on the voltages of the first node and the second node; and a second output circuit which outputs a carry signal to a next stage based on the voltages of the first node and the second node, wherein the control circuit comprises a first transistor connected to the input terminal and the first node, and comprising a gate connected to a first clock terminal to which a first clock signal is input, the first output circuit comprises a second transistor connected to a first output terminal, which outputs the output signal, and a second clock terminal, to which a second clock signal is input, and comprising a gate connected to the first node, and the second output circuit comprises a third transistor connected to a second output terminal, which outputs the carry signal, and a third clock terminal, to which a third clock signal is input, and comprising a gate connected to the first node, wherein the second clock signal swings between a first voltage and a second voltage lower than the first voltage, and the first clock signal and the third clock signal swing between the first voltage and a third voltage lower than the second voltage, wherein the third clock signal is input phase-shifted from the first clock signal by a ½ period.

12. The driving circuit of claim 11, wherein a duration during which the first clock signal is in a level of the third voltage does not overlap a duration during which the second clock signal is in a level of the second voltage, wherein the duration during which the first clock signal is in the level of the third voltage is longer than the duration during which the second clock signal is in the level of the second voltage.

13. The driving circuit of claim 11, wherein the first output circuit further comprises a fourth transistor connected to a first terminal, to which the first voltage is input, and the first output terminal, and comprising a gate connected to the second node, and the second output circuit further comprises:

a fifth transistor connected to the first terminal and the second output terminal, and comprising a gate connected to the second node; and a first capacitor connected to the second output terminal and the first node.

14. The driving circuit of claim 13, wherein the control circuit further comprises:

a sixth transistor connected between the first terminal and the first node, and comprising a gate connected to the second node;

a seventh transistor connected between the sixth transistor and the first node, and comprising a gate connected to the second clock terminal;

an eighth transistor connected to the second node and a fourth clock terminal, to which a fourth clock signal is input, and comprising a gate connected to the first node;

a ninth transistor connected to the second node and a second terminal, to which the second voltage is input, and comprising a gate connected to the first clock terminal;

a tenth transistor connected to the first transistor and the first node, and comprising a gate connected to a third terminal, to which the third voltage is input; and a second capacitor connected to the first terminal and the second node, wherein the fourth clock signal swings between the first voltage and the second voltage and is input phase-shifted from the second clock signal by a ½ period.

15. The driving circuit of claim 13, wherein the control circuit further comprises:

a sixth transistor connected between the first terminal and the first node, and comprising a gate connected to the second node;

a seventh transistor connected between the sixth transistor and the first node, and comprising a gate connected to the second clock terminal;

an eighth transistor connected to the second node and a fourth clock terminal, to which a fourth clock signal is input, and comprising a gate connected to the first node;

a ninth transistor connected to the second node and a second terminal, to which the third voltage is input, and comprising a gate connected to the first clock terminal;

a tenth transistor connected to the first transistor and the first node, and comprising a gate connected to the second terminal; and a second capacitor connected to the first terminal and the second node, wherein the fourth clock signal swings between the first voltage and the second voltage and is input phase-shifted from the second clock signal by a ½ period.

16. An electronic device comprising:

a controller which outputs a plurality of clock signals;

a power supply circuit which outputs a reference voltage; and a driving circuit which outputs a gate signal based on the plurality of clock signals and the reference voltage, wherein the driving circuit comprises a plurality of stages, wherein each of the plurality of stages comprises:

a first transistor connected to an input terminal, to which a start signal is input, and a first node and comprising a gate connected to a first clock terminal, to which a first clock signal is input; and a second transistor connected to a first output terminal and a second clock terminal, to which a second clock signal is input, and comprising a gate connected to the first node, wherein the second clock signal swings between a first voltage and a second voltage lower than the first voltage, and the first clock signal swings between the first voltage and a third voltage lower than the second voltage.

17. The electronic device of claim 16, wherein each of the plurality of stages further comprises:

a third transistor connected to a first terminal, to which the first voltage is input, and the first output terminal, and comprising a gate connected to a second node;

a fourth transistor connected to the first terminal and a second output terminal, and comprising a gate connected to the second node;

a fifth transistor connected to the second output terminal and a third clock terminal, to which a third clock signal is input, and comprising a gate connected to the first node; and a first capacitor connected to the second output terminal and the first node, wherein the third clock signal swings between the first voltage and the third voltage and is input phase-shifted from the first clock signal by a ½ period.

18. The electronic device of claim 17, wherein each of the plurality of stages further comprises:

a sixth transistor connected between the first terminal and the first node, and comprising a gate connected to the second node;

a seventh transistor connected between the sixth transistor and the first node, and comprising a gate connected to the second clock terminal;

an eighth transistor connected to the second node and a fourth clock terminal, to which a fourth clock signal is input, and comprising a gate connected to the first node; and a ninth transistor connected to the second node and a second terminal, to which the second voltage is input, and comprising a gate connected to the first clock terminal, wherein the fourth clock signal swings between the first voltage and the second voltage and is input phase-shifted from the second clock signal by a ½ period.

19. The electronic device of claim 18, wherein each of the plurality of stages further comprises a tenth transistor connected to the first transistor and the first node, and comprising a gate connected to a third terminal, to which the third voltage is input.

20. The electronic device of claim 17, wherein each of the plurality of stages further comprises:

a sixth transistor connected between the first terminal and the first node, and comprising a gate connected to the second node;

a seventh transistor connected between the sixth transistor and the first node, and comprising a gate connected to the second clock terminal;

an eighth transistor connected to the second node and a fourth clock terminal, to which a fourth clock signal is input, and comprising a gate connected to the first node;

a ninth transistor connected to the second node and a second terminal, to which the third voltage is input, and comprising a gate connected to the first clock terminal; and a tenth transistor connected to the first transistor and the first node, and comprising a gate connected to the second terminal, wherein the fourth clock signal swings between the first voltage and the second voltage and is input phase-shifted from the second clock signal by a ½ period.

* * * * *